UNITED STATES PATENT OFFICE.

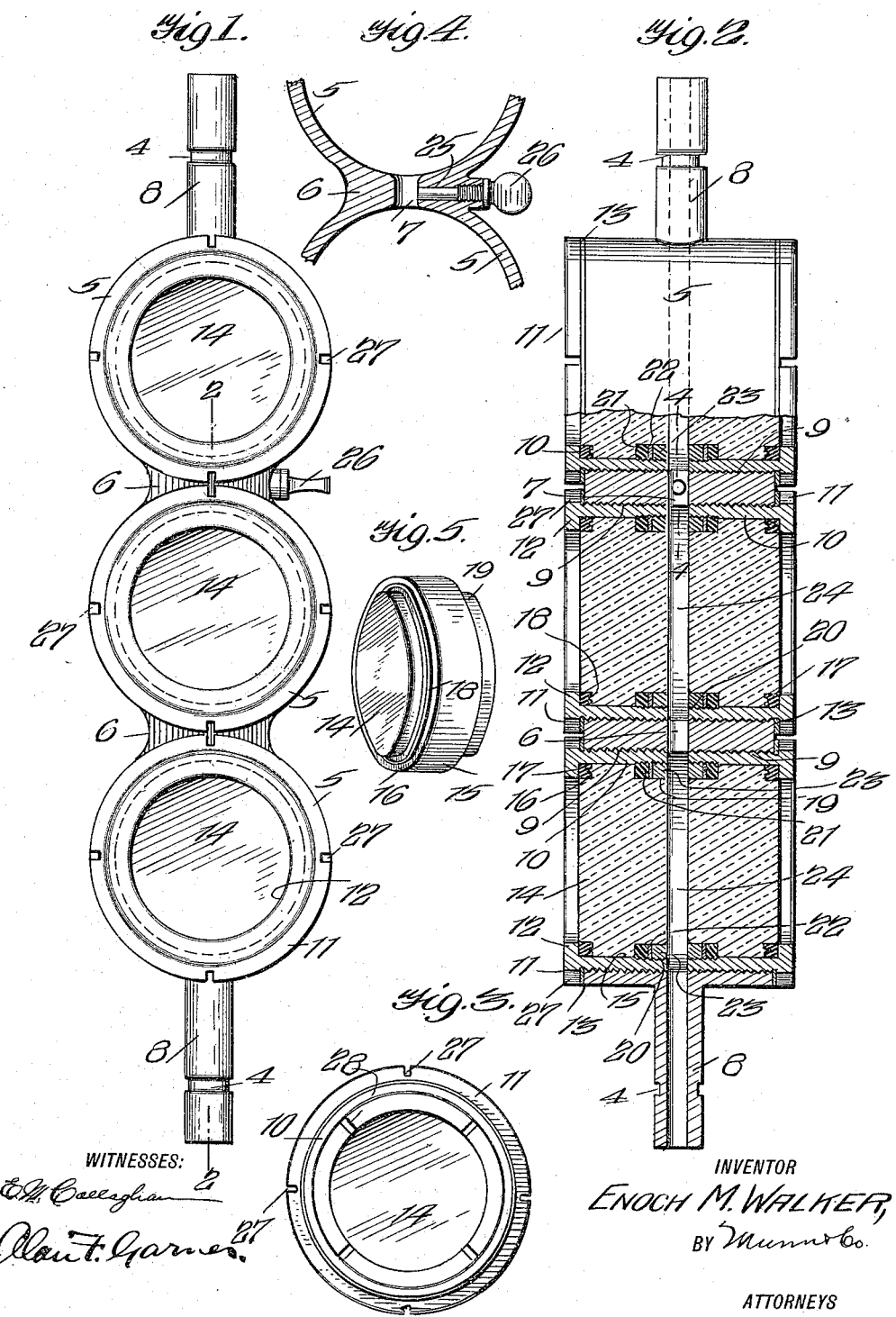

ENOCH MATTHEW WALKER, OF ST. LOUIS, MISSOURI.

SAFETY WATER-GAGE.

1,176,503. Specification of Letters Patent. Patented Mar. 21, 1916.

Application filed March 1, 1915. Serial No. 11,422.

*To all whom it may concern:*

Be it known that I, ENOCH M. WALKER, a citizen of the United States, and a resident of the city of St. Louis, in the State of Missouri, have invented an Improvement in Safety Water-Gages, of which the following is a specification.

This invention relates to an improvement in water gages, and more particularly to an improved gage adapted for use in connection with a locomotive boiler to indicate the height of the water therein.

One of the principal objects of the invention is to provide a gage consisting of a plurality of oppositely disposed pairs of glasses arranged at opposite ends of the cylindrical chambers of the gage, whereby the height of the water may be viewed from either side of the gage, the construction being such that a particularly strong and safe method of mounting the glasses is provided.

Another object of the invention is to provide a gage in the form of a plurality of cylindrical chambers communicating with each other and being closed at their ends by removable sleeves carrying the gage glasses through which the height of the water in the gage may be viewed, the manner of arrangement and construction of the sleeves and glass mountings being such as to provide an extremely strong and safe instrument.

Still another object is to provide a device of the class described which will be extremely simple, durable, efficient in operation, and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a view in elevation of a gage constructed according to my invention. Fig. 2 represents a view in section taken longitudinally on the plane indicated by the line 2—2 of Fig. 1. Fig. 3 represents a view in elevation of one of the bushings or sleeves with a glass mounted therein, looking at the same from the inner end thereof. Fig. 4 represents a fragmentary view in section taken on the plane indicated by the line 4—4 of Fig. 2. Fig. 5 represents a view in perspective of one of the gage glasses removed.

In carrying out my invention I provide a gage whose casing is in the form of a plurality of cylindrical chambers indicated generally at 5, connected by the web portions 6 and communicating with each other through alined openings 7 provided in the web portions. At each end of the casing is provided a pipe section or nipple 8 for connection with pipe sections (not shown) leading to the boiler, in the usual manner. The cylindrical chambers together with the nipples 8, are preferably cast integrally. By having the cylindrical chamber and nipple in one solid casting, leakage is prevented, and further an advantage in the economy of manufacture is attained. The nipples or stems 8 as shown, are each provided exteriorly with a groove for the reception of suitable gaskets, so that there will be no danger of the gasket being blown out when the nipples are connected with the pipe sections leading to the boiler. The chambers are internally threaded from both ends as at 9, for the reception of the bushings 10. A bushing is carried at each end of each chamber, and the bushings are all made alike. Each bushing is externally threaded for screw engagement with the cylinders. The outer end of each bushing is provided with an outwardly extending peripheral flange 11 and with an inwardly extending flange 12. The outwardly extending flanges 11 of the bushings overhang the ends of the casings and when the bushings are screwed home, the flanges engage against washers 13 which are placed upon the bushings previously to their being screwed home.

Within each bushing or sleeve 10 is adapted to be disposed one of the gage glasses 14. Each glass is substantially cylindrical in shape and is ground on its outer surface as at 15, and snugly fits within the bushing. At the outer end of the glass it is recessed or rabbeted at 16 for the reception of a compressible annular gasket 17. The floor of the rabbet is provided with an annular protruding rib 18 adapted to engage against the gasket 17 for providing a very tight joint.

The inner end of each glass 14 is provided with a rabbet at 19 of a greater depth than the depth of the rabbet 16. Each bushing 10 at its inner end is internally threaded as at 20 for a distance equal to the depth of rabbet 19. Last said rabbet is adapted to initially receive a compressible ring or gasket 21, subsequently a metallic washer 22, and then a metallic ring 23. The latter is externally threaded for screw engagement with the bushing internally thereof and at its inner end for compressing the washers and the gaskets against the glass and the bushing whereby to provide a water and steam proof joint. When the glasses are all mounted in their bushings, and the latter are in place in the cylindrical casings, a space indicated at 24 is defined between each pair of glasses. These spaces are in constant communication with each other through the openings 7 and are in communication with the nozzles 8, so that the water may flow upwardly and downwardly through the cylindrical casings and between the glasses, as the level of the water in the boiler varies. The level of the water in the gage may thus be viewed through the glasses from both ends of the cylindrical chambers, so that when the gage is mounted in place in the cab of a locomotive, the height of the water in the boiler may be instantly ascertained either by the fireman or engineer.

Between two of the chambers, the web 6 is provided with a passage or opening at 25, and the latter is normally closed by means of a threaded plug 26. The passage 25 is provided whereby oil may be introduced into the gage when needed. The oil duct and plug are preferably provided between the two uppermost casings.

The outwardly extending flanges 11 of the bushings, as well as the threaded rings 23, are provided with pairs of diametrically opposed recesses or notches 27 and 28, respectively, for the reception of a suitable wrench whereby the parts may be disassembled at will.

Such a gage as I have provided will allow of any one of the gage glasses being removed at will without disturbing the others, and it further provides an exceptionally strong and watertight construction, so that danger of breakage or leakage will be reduced to a minimum. The novel construction of the glasses and arrangement by which they are maintained in position insures the retention against accidental displacement of the glasses and insures a water-tight and steam tight joint between the glasses and the bushings, at the same time allowing of the ready removal of any of the glasses individually, when such action is found desirable.

Should the glasses in my improved gage, crack, they will not blow out but will only permit a very little steam and water to leak through, so that the danger of leakage and blow-outs incident to the old types of water gages is eliminated.

Although I have described the preferred embodiment of my invention, I may desire to make such changes in the construction, combination and arrangement of parts thereof as do not depart from the spirit of the invention and the scope of the appended claims.

I claim:—

1. A gage comprising a casing in the form of a plurality of parallel cylindrical chambers having web portions connecting them and having pipe sections provided on the ends of the casing, said cylindrical chambers being open at their ends and being in communication with each other through the medium of passages provided in said web portions, a plurality of bushings adapted each to be disposed in one of the cylindrical chamber ends, said chambers being internally threaded and said bushings being externally threaded, said bushings each at its outer end being provided with an outwardly extending and with an inwardly extending annular flange and at its inner end being internally threaded for a distance, a cylindrical gage glass adapted to be disposed in the bushing and being rabbeted at its outer and at its inner ends, a compressible gasket adapted to be disposed in the rabbet at the outer end of the glass, the floor of last said rabbet being provided with a protruding annular rib, a second compressible gasket, a non-compressible washer and a non-compressible ring adapted to be disposed in superposed arrangement within the rabbet at the inner end of the glass, said non-compressible ring being externally threaded whereby to engage within the bushing at its inner end for compressing the gaskets against the bushing and glass, and a washer adapted to be engaged between the adjacent end of the cylindrical chamber and said outwardly extending annular flange.

2. A gage comprising a casing in the form of a plurality of web connected internally threaded cylindrical chambers open at their ends, said chambers being in communication with each other, a plurality of bushings adapted each to be disposed in one of the casing ends, each bushing being externally threaded and being provided at its outer end with an outwardly extending flange, a washer adapted to be engaged between said outwardly extending flange and the adjacent chamber end, a cylindrical glass adapted to be disposed within the bushing and provided with gasket receiving rabbets at its ends, gaskets adapted to be disposed within said rabbets, and a ring adapted to be disposed within the rabbet at the inner end of the glass and to adjustably engage within the bushing, whereby to tighten said gaskets against the glass and bushing.

3. A gage including a cylindrical open ended chamber, a bushing adapted to be disposed in one end of the chamber, said bushing at its outer end being provided with an outwardly extending chamber overhanging flange and with an inwardly extending flange, a glass disposed within the bushing and being provided with gasket receiving rabbets adjacent its ends, gaskets adapted to be disposed within the rabbets, and a ring adapted to be disposed in the inner end of the bushing, within the chamber, and to be adjusted relatively to the said inwardly extending flange for tightening the gaskets and glass in position.

ENOCH MATTHEW WALKER.

Witnesses:
SAMUEL THOMAS SMITH,
FRANK AARON DICKERMAN.

Copies of this patent may be obtained for five cents each, by addressing the "Commissioner of Patents, Washington, D. C."